US006935263B1

(12) United States Patent
Bandyopadhyay

(10) Patent No.: US 6,935,263 B1
(45) Date of Patent: Aug. 30, 2005

(54) WAKE ABSORBER

(75) Inventor: Promode R. Bandyopadhyay, Portsmouth, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/863,832

(22) Filed: Jun. 7, 2004

(51) Int. Cl.[7] .............................. B63B 1/22; F03B 13/12
(52) U.S. Cl. ........................ 114/284; 310/339; 310/800
(58) Field of Search ..................... 114/284, 312, 382; 623/24; 310/328, 338, 339, 800; 60/497

(56) References Cited

U.S. PATENT DOCUMENTS

| | | | |
|---|---|---|---|
| 4,404,490 A * | 9/1983 | Taylor et al. ............... | 310/339 |
| 4,685,296 A * | 8/1987 | Burns ........................... | 60/497 |
| 5,114,104 A | 5/1992 | Cincotta et al. | |
| 5,222,455 A | 6/1993 | Furey | |
| 5,662,294 A | 9/1997 | Maclean et al. | |
| 6,168,634 B1 | 1/2001 | Schmitz | |
| 6,583,533 B2 * | 6/2003 | Pelrine et al. ............... | 310/800 |
| 6,768,246 B2 * | 7/2004 | Pelrine et al. ............... | 310/339 |
| 6,812,624 B1 * | 11/2004 | Pei et al. ..................... | 310/800 |

* cited by examiner

*Primary Examiner*—Lars A. Olson
(74) *Attorney, Agent, or Firm*—Jean-Paul A. Nasser; James M. Kasischke; Michael P. Stanley

(57) ABSTRACT

A wake absorber, wherein an aquatic vehicle with a propulsor mounted on the vehicle and operative to propel the vehicle through a water medium, has a wake absorber mounted on the vehicle aft of the propulsor. The wake absorber includes an artificial muscle surface adapted to be impinged upon by a wake created by the propulsor. The wake absorber further includes electrodes mounted on the artificial muscle surface. Pressure of the wake upon the muscle surface exercises a bending force on the surface, which creates energy that is recovered by the electrodes as electrical power that can be digitized. Energy removed from the muscle surface by the electrodes weakens the wake and renders the wake less pronounced visually and acoustically.

16 Claims, 5 Drawing Sheets

WAKE ABSORBER

STATEMENT OF GOVERNMENT INTEREST

The invention described herein may be manufactured and used by or for the Government of the United States of America for Governmental purposes without the payment of any royalties thereon or therefore.

CROSS REFERENCE TO OTHER RELATED APPLICATIONS

Not applicable.

BACKGROUND OF THE INVENTION (1) Field of the Invention

The invention relates to the reduction of a visible wake of a surface vessel or underwater vessel having a structure extending above the surface, and of a submerged wake.

(2) Description of the Prior Art

The surface wake of a ship, or a near surface submarine, is easy to detect from an airplane or satellites. The underwater wake of a propulsor can last for long distances because it is basically a longitudinal vortex, which dissipates slowly. A device to control such wakes would provide stealth to such vessels when needed. In commercial applications, the mitigation of a wake of a large vehicle or propulsor allows closer spacing of ships moving in line one behind the other.

There is a need for devices for mitigating as well as detecting propulsor wakes, for both underwater and surface vehicles. Wake mitigation makes the acoustic and non-acoustic diagnostic of the wakes of vehicles more difficult. For surface ships, any mitigation of the frothy white wakes of vehicles makes their direct visual or satellite observation somewhat more difficult.

SUMMARY OF THE INVENTION

An object of the invention is, therefore, to provide an aquatic vehicle in combination with a wake absorber that reduces the wake of the vehicle to render the wake less pronounced visually and acoustically.

A further object of the invention is to provide an aquatic vehicle in combination with apparatus for altering the flow of a wake to modify the tonal output of the vehicle propulsor.

A still further object of the invention is to provide apparatus for detecting and identifying the wakes of aquatic vessels.

With the above and other objects in view, a feature of the present invention is the provision of an aquatic vehicle in combination with a wake absorber. The combination comprises an aquatic vehicle, a propulsor mounted on the vehicle and operative to propel the vehicle through a water medium, and a wake absorber mounted on the vehicle aft of the propulsor. The wake absorber comprises an artificial muscle surface adapted to be impinged upon by a wake created by the propulsor. The wake absorber further comprises electrodes mounted on the artificial muscle surface. Pressure of the wake upon the muscle surface exercises a bending force on the surface, which creates energy that is then recovered by the electrodes as electrical power. Energy removed from the muscle surface by the electrodes weakens the wake and renders the wake less pronounced visually and acoustically.

In accordance with a further feature of the invention, there is provided an aquatic vehicle in combination with a wake modifying assembly. The combination comprises an aquatic vehicle, a propulsor mounted on the vehicle and operative to propel the vehicle through a water medium, and a wake modifying assembly mounted on the vehicle aft of the propulsor, the assembly comprising an artificial muscle surface adapted to be impinged upon by a wake, and electrodes mounted on the artificial muscle surface. Power means direct an electrical signal to the electrodes to cause the muscle surface to deflect so as to alter flow of the wake and thereby modify tonal signals of the propulsor.

In accordance with a still further feature of the invention, there is provided an aquatic vehicle in combination with a wake modifier, the combination comprising an aquatic vehicle, a propulsor mounted on the vehicle and operative to propel the vehicle through a water medium, and a wake modifier mounted on the vehicle aft of the propulsor. The wake modifier comprises an artificial muscle surface adapted to be impinged upon by a wake created by the propulsor, electrodes mounted on the artificial muscle surface, and a power source in communication with the electrodes. Pressure of the wake upon the muscle surface exercises a bending force on the surface, which creates energy which is recovered by the electrodes as electrical power, energy removed from the muscle surface by the electrodes weakening the wake and rendering the wake less pronounced visually and acoustically. A signal selectively transmitted from the power source to the electrodes operates to cause the muscle surface to deflect so as to alter flow of the wake and thereby modify tonal signals of the propulsor.

In accordance with a still further feature of the invention, there is provided a wake detector comprising an artificial muscle surface of an electro-active polymeric material, the surface being adapted to be impinged upon by a wake created by a propulsor of an aquatic vehicle, and electrodes mounted on the artificial muscle surface and in contact therewith. Pressure exerted by a wake upon the muscle surface exercises a bending force on the surface, which creates energy which is recovered by the electrodes as electrical power and transmitted by insulated electrical leads to a monitor means. The monitor means digitizes the electrical impulses from the electrode.

In accordance with a still further feature of the invention, the monitor means noted immediately above comprises a wake identification facility, such that the wake detector by virtue of digitizing the wake signals thereby functions further as a wake signature detector.

The above and other features of the invention, including various novel details of construction and combinations of parts, will now be more particularly described with reference to the accompanying drawings and pointed out in the claims. It will be understood that the particular devices embodying the invention are shown by way of illustration only and not as limitations of the invention. The principles and features of this invention may be employed in various and numerous embodiments without departing from the scope of the invention.

BRIEF DESCRIPTION OF THE DRAWINGS

Reference is made to the accompanying drawings in which are shown illustrative embodiments of the invention, from which its novel features and advantages will be apparent, wherein corresponding reference characters indicate corresponding parts throughout the several views of the drawings and wherein.

DESCRIPTION OF THE PREFERRED EMBODIMENTS

Figure 1:
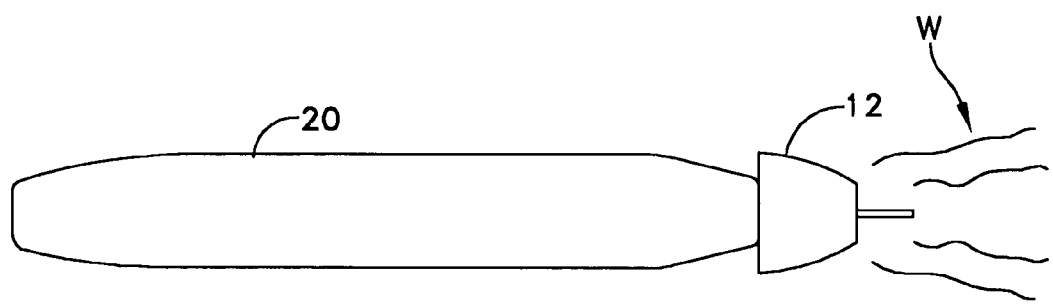
FIG. 1 is a side elevational view of a known aquatic vehicle of the underwater type.

Referring to FIG. 1, there is shown an aquatic vehicle 20 which may be virtually any aquatic vehicle having self-contained means for propelling the vehicle through a water medium, either wholly or in part on the surface or beneath the surface of the water.

A propulsor 22 is mounted on the vehicle 20 and includes thrust-producing means, typically one or more propellers, or a jet nozzle. The propulsor creates an energetic wake W that is detectable acoustically and, if the vehicle 20 is wholly or in part on the surface, is detectable visually, particularly from airborne observation platforms.

Figure 2:
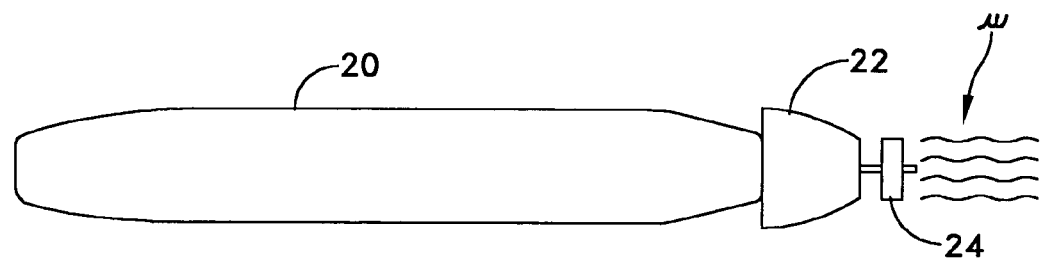
FIG. 2 is a side elevational view of the aquatic vehicle of FIG. 1 in combination with a wake absorber, illustrative of an embodiment of the invention.

In FIG. 2, there is shown the same vehicle 20 with a wake absorber 24 mounted on the vehicle and effective to absorb energy from the wake so as to trail a reduced wake, which is less pronounced and therefore less likely to be detected, visually or acoustically.

Figure 3:
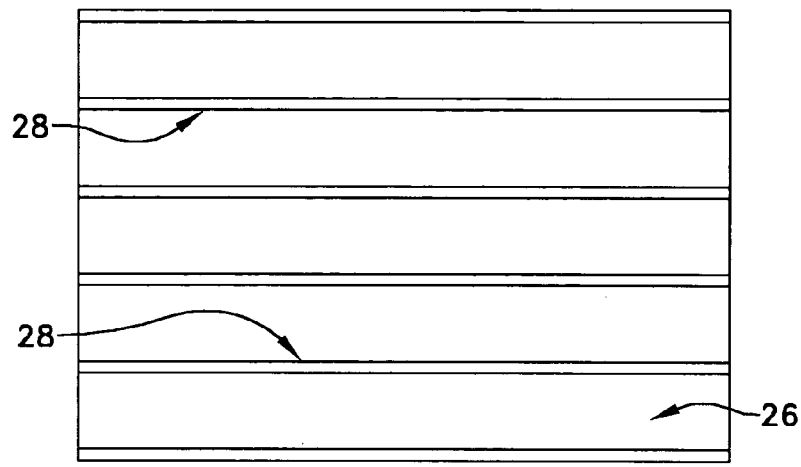
FIG. 3 is a side diagrammatical view of one form of artificial muscle surface used in the wake absorber of FIG. 2.
Figure 4:
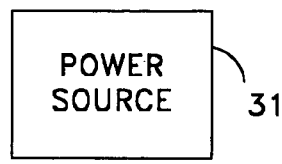
FIG. 4 is an enlarged side diagrammatical view of a portion of the surface of FIG. 3.
Figure 4:
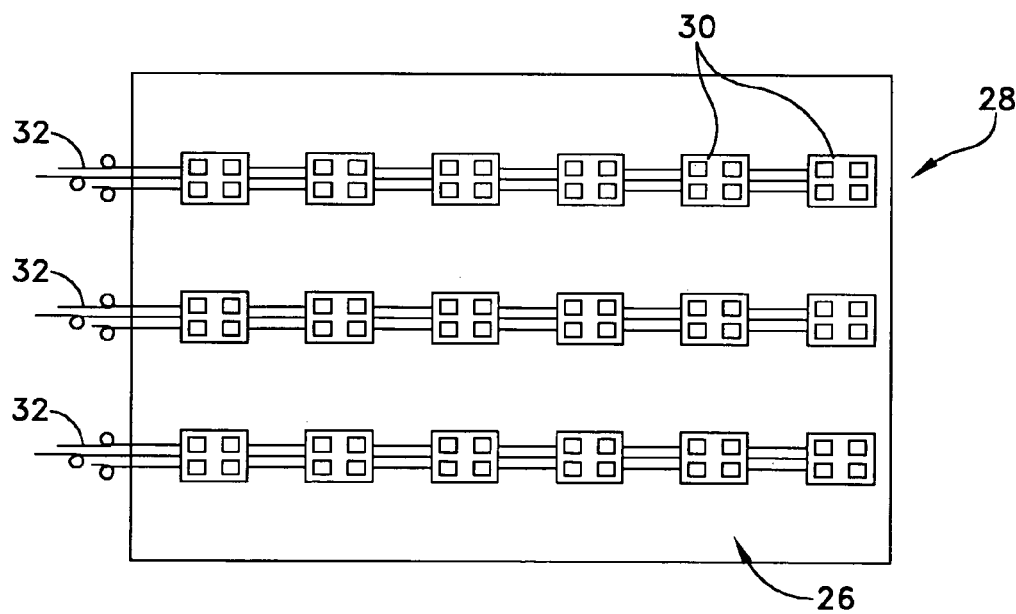

Referring to FIG. 3, it will be seen that a component of the wake absorber 24 is an artificial muscle surface 26 having mounted thereon or therein arrays 28 of electrodes 30. The artificial muscle surface 26 preferably is of an electro-active polymeric material. There are several electro-active materials known in the art for use in artificial muscle applications that are applicable to the present invention. For example, there are dielectric elastomers such as the silicon based HS3™ manufactured by Dow Corning, or the acrylic based VHB 4910™ manufactured by 3M. There are relaxor ferroelectric polymers made of polyvinylidene fluoride-trifluoroethylene. There are conducting polymers also known as conjugated polymers made of polypyrrole or polyaniline. There are ionic polymer/metal composites fabricated with ion exchange membranes such as Nafion™ from Dupont, USA. The artificial muscle surface 26 should be flexible and capable of supporting numerous arrays 28 of miniature electrodes 30 (FIG. 4) which are exposed to the muscle surface 26. The electrodes 30 are capable of generating a voltage across muscle surface 26, or of converting mechanical energy from the muscle surface 26 into electricity.

When the wake fluid stream arrives at the muscle, the fluid-structural interaction tends to deflect the muscle surface 26. However, because the surface 26 is an electro-active polymeric muscle, and because of the operation of the electrodes 30 that are joined to a power source 31 that is producing shaped pulsed wave forms, the energy which normally would deflect the surface 26 is recovered as electrical power by electrodes 30 and the surface 26 remains essentially unmoved, although minute movements of the surface occur. The artificial muscle 26 acts as an absorber of the kinetic and potential energy of the wake and the electrodes 30 convert at least a portion thereof to electricity.

The electrodes 30 may be built into the surface 26 or may be pressed onto the surface 26. In a preferred embodiment, the electrodes 30 are transducers with programmable electronics packages in communication with the above mentioned power source 31 and operative to convert the deflecting forces on the muscle surface into electricity.

The electrodes 30 are provided with leads 32 that are electrically insulated from the muscle 26, while the electrodes 30 are exposed to the muscle 26 and act as sensors and produce electricity.

Figure 5:
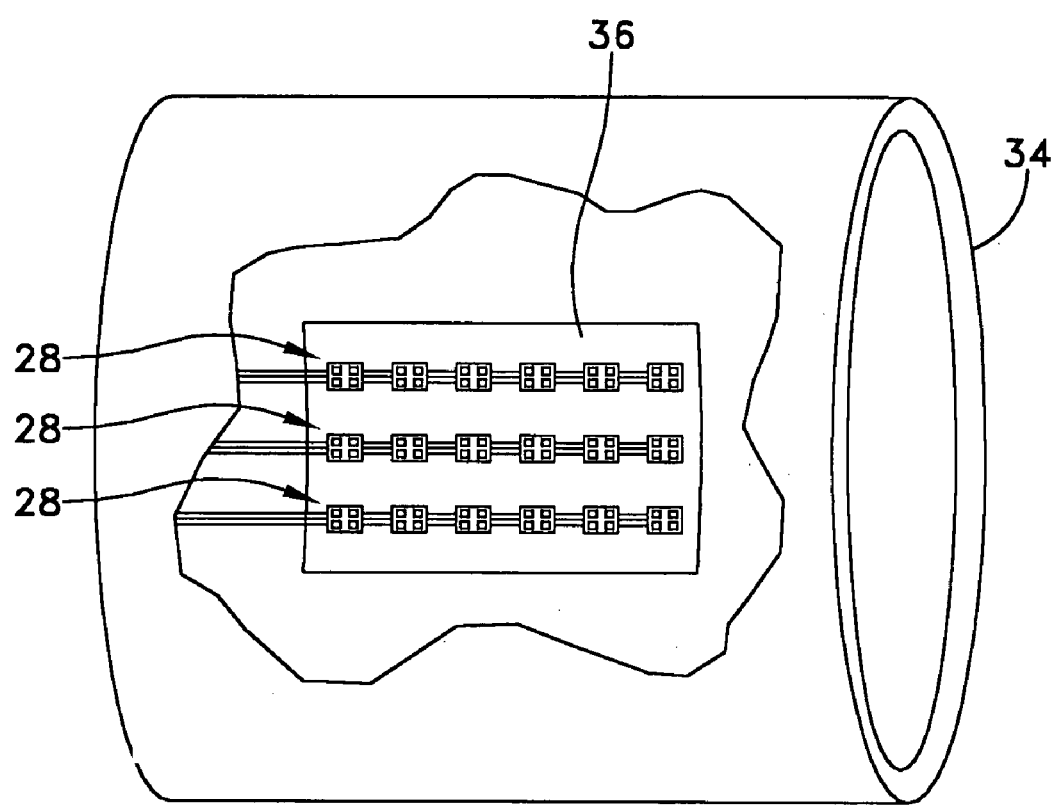
FIG. 5 is a perspective diagrammatical view of the portion of FIG. 4 mounted on a circular surface.

Referring to FIG. 5, it will be seen that the muscle surface 26 may be in the form of a cylindrically shaped tube 34. In FIG. 5, only a portion 36 of the electrode arrays 28 is shown.

Figure 6:
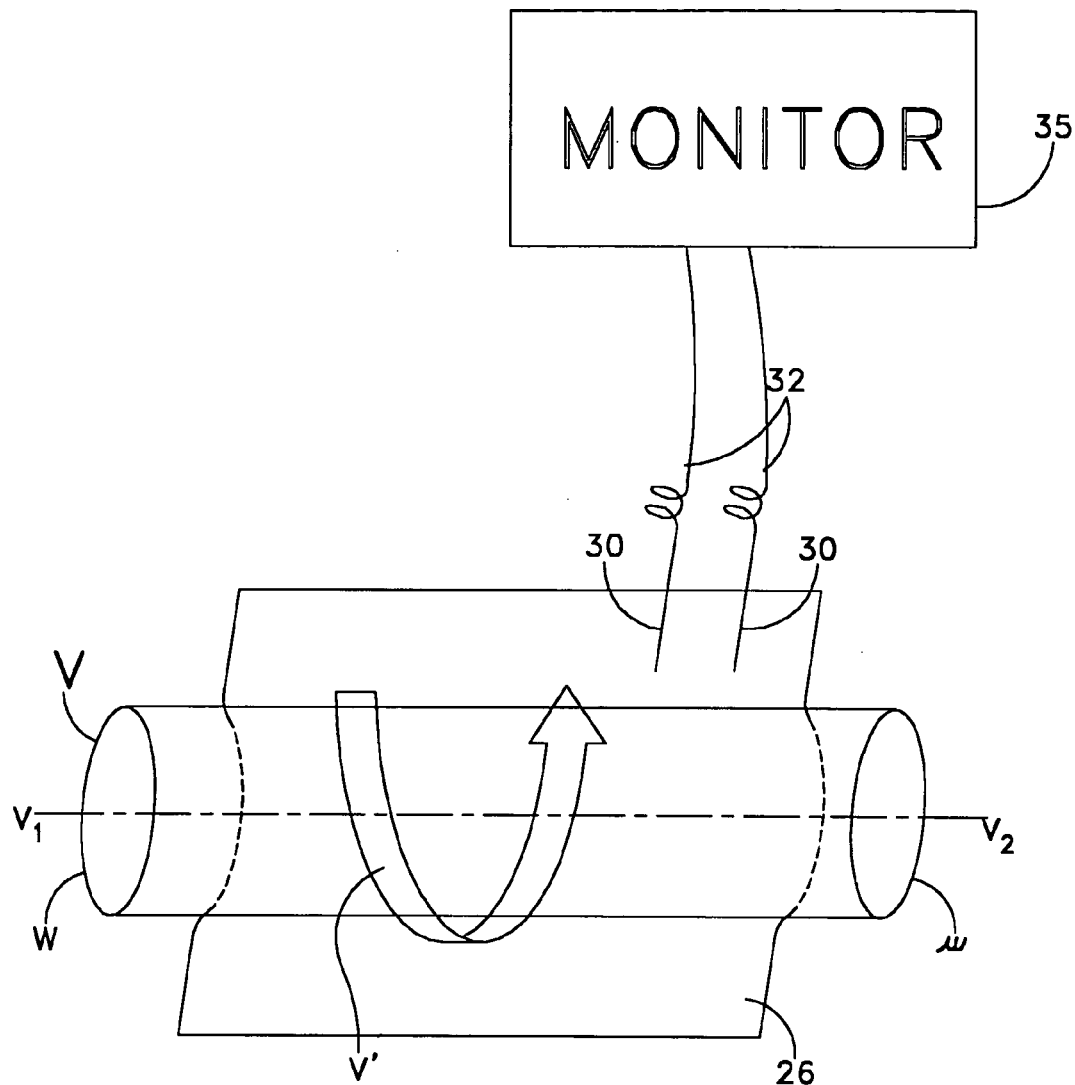
FIG. 6 is a wholly diagrammatical view of another form of artificial muscle surface.

In FIG. 6, it is shown how a wake vortex V moving along an axis v1, v2 essentially parallel to a muscle surface 26, but moving also in a vortex swirl direction $V^1$, can exercise a bending force on the muscle surface. In such instance, the electrodes 30, shown diagrammatically in FIG. 6, transmit electricity through the leads 32, absorbing energy from the wake W and reducing it to the lesser wake w.

Figure 7:
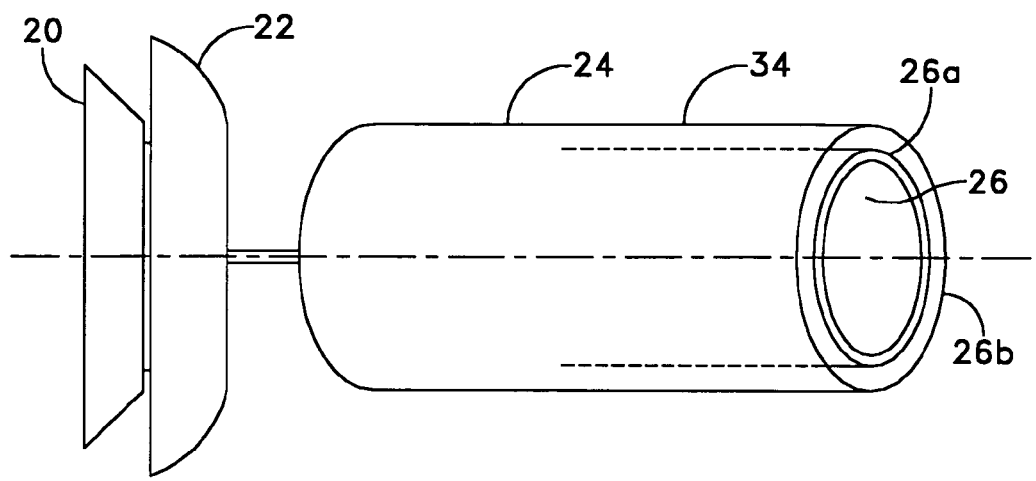
FIG. 7 is a partly side elevational view and partly perspective view of a propulsor and a wake absorber of the type shown in FIGS. 5 and 6.

In FIG. 7, there is shown an embodiment in which concentric muscle sleeves 26, 26a and 26b are utilized.

Figure 8:
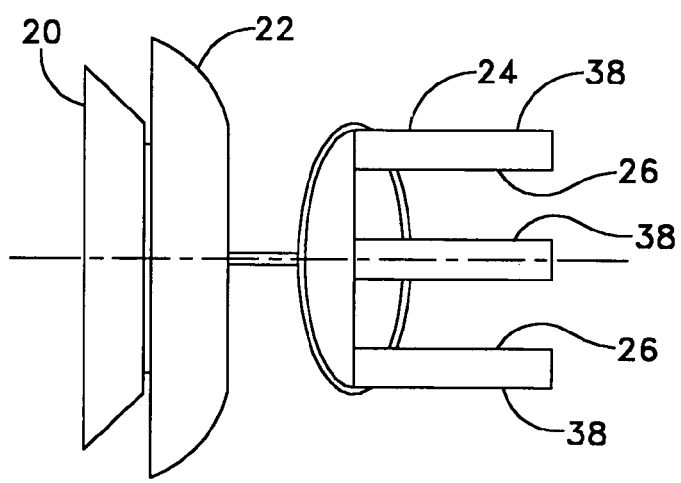
FIG. 8 is a partly side elevational and partly diagrammatical view of an alternative embodiment of wake absorber.

In FIG. 8, ribbons 38 of muscle surfaces 26 are trailed aft of the propulsor 22. As described hereinabove, the muscle surface acts as a wake absorber, reducing a wake so as to diminish the likelihood of its being detected. The wake absorber 24 and associated electronic equipment essentially digitizes a segment of a wake. The conversion of a flow field to digital bits has significance not only in control, as in wake absorption, but also for detection of vessels. That is, the wake absorber 24 can also be used to detect the wakes of other vessels. The wake absorber 24 may be towed or carried by an unmanned undersea vehicle and used as a means for detecting and identifying wakes of other vehicles. Signals generated by the electrodes 30 are transmitted by the leads 32 to a monitor 35. Preferably, the monitor 35 is provided with wake identification means, providing the system with a wake identification capability.

Another use for the wake absorber 24 is to program the electronic package within each electrode 30 to introduce programmed disturbances into a wake by way of energizing the electrodes 30, to confuse an enemy. In particular, the wake absorber apparatus can mask the unique blade tonals of individual vessel.

It will be apparent that any or all of the power source 31 and monitor 35 can be combined in one structural unit (not shown). There is thus provided a wake absorber apparatus which is useful in (1) reducing the wakes of aquatic vehicles by withdrawing energy from the wakes attenuating both the visual and acoustic aspect of the wake (2) detecting the wakes of other aquatic vehicles, and (3) altering the "signatures" of aquatic vehicles by deliberately inputting energy into the wakes thereof.

It will be understood that many additional changes in the details, materials, steps and arrangement of parts, which have been herein described and illustrated in order to explain the nature of the invention, may be made by those skilled in the art within the principles and scope of the invention as expressed in the appended claims.

The foregoing describes the invention in terms of embodiments foreseen by the inventor and for which an enabling description is available. Insubstantial modifications of the invention not presently foreseen may nonetheless represent equivalents.

What is claimed is:

1. An apparatus for absorbing a wake created by an aquatic vehicle having a propulsor mounted on said aquatic vehicle comprising:
   an artificial muscle surface mounted on said aquatic vehicle aft of said propulsor, adapted to be impinged upon by a wake created by said propulsor; and
   at least one electrode mounted on said artificial muscle surface wherein pressure of the wake upon said artificial muscle surface exercises a bending force on said artificial surface, which bending force creates energy that is recoverable by said at least one electrode as electrical power.

2. The apparatus in accordance with claim 1 wherein said artificial muscle surface is made of an electro-active polymeric material.

3. The apparatus in accordance with claim 2 wherein electrodes are exposed to the electro-active polymeric material.

4. The apparatus in accordance with claim 3 further comprising:
   at least one power source joined to said at least one electrode wherein said at least one electrode is provided with insulated electrical leads placing said at least one electrode in communication with said at least one power source; and
   at least one monitoring means joined to said at least one electrode wherein said at least one electrode is provided with insulated electrical leads placing said at least one electrode in communication with said at least one monitoring means.

5. The apparatus in accordance with claim 4 wherein said at least one electrode is responsive to signals from the at least one power source to move said artificial muscle surface to modify the wake and thereby modify a tonal output of said propulsor.

6. The apparatus in accordance with claim 1 wherein said artificial muscle surface is disposed on inside wall portions of a cylindrically shaped first tube.

7. The apparatus in accordance with claim 6 wherein:
   at least a second cylindrically shaped tube is disposed concentrically of said first tube; and
   an artificial muscle surface is disposed on said second tube.

8. The apparatus in accordance with claim 1 further comprising:
   power means for directing an electrical signal to said at least one electrode to cause said muscle surface to deflect the wake so as to alter flow of the wake and thereby modify tonal signals of the propulsor.

9. The apparatus in accordance with claim 8 wherein said at least one electrode is provided with insulated electrical leads placing said at least one electrode in communication with said power means.

10. The apparatus in accordance with claim 9 wherein said at least one electrode is responsive to signals from said power means to move said muscle surface to modify the wake and thereby modify tonal output of said propulsor.

11. An aquatic vehicle in combination with a wake modifier, the combination comprising:
    an aquatic vehicle;
    a propulsor mounted on said aquatic vehicle producing tonal signals and operative to propel said aquatic vehicle through a water medium;
    a wake modifier mounted on said aquatic vehicle aft of said propulsor, said wake modifier comprising an artificial muscle surface adapted to be impinged upon by a wake created by said propulsor, said wake modifier further comprising a plurality of electrodes mounted on said artificial muscle surface wherein pressure of the wake upon said artificial muscle surface exercises a bending force on said artificial muscle surface, which bending force creates energy which is recovered by said plurality of electrodes as electrical power, energy removed from said artificial muscle surface by said plurality of electrodes weakening the wake and rendering the wake less pronounced visually and acoustically; and
    a power source in communication with said plurality of electrodes wherein a signal selectively transmitted from said power source to said plurality of electrodes operates to cause said artificial muscle surface to deflect so as to alter flow of the wake and thereby modify tonal signals of said propulsor.

12. The combination in accordance with claim 11 wherein:
    said artificial muscle surface is of an electro-active polymeric material; and
    said plurality of electrodes are exposed to the electro-active polymeric material.

13. The combination in accordance with claim 12 wherein said plurality of electrodes are provided with insulated electrical leads placing said plurality of electrodes in communication with said power source.

14. A wake detector comprising:
    an artificial muscle surface of an electro-active polymeric material, the surface being adapted to be impinged upon by a wake created by a propulsor of an aquatic vehicle; and
    a plurality of electrodes mounted on said artificial muscle surface and in contact therewith;
    wherein pressure exerted by a wake upon said artificial muscle surface exercises a bending force on said artificial muscle surface, which bending force creates energy that is recovered by said plurality of electrodes as electrical power and transmitted across insulated electrical leads to a monitor.

15. The wake detector in accordance with claim 14 wherein the electrical power transmitted across insulated electrical leads to a monitor comprises digitized electrical signals representative of a segment of the wake.

16. The wake detector in accordance with claim 14 wherein the monitor is provided with a wake identification facility, such that the wake detector is provided with a wake signature identification capability.

* * * * *